(12) United States Patent
Harada et al.

(10) Patent No.: US 10,203,690 B2
(45) Date of Patent: Feb. 12, 2019

(54) FORMATION SETTING APPARATUS, FORMATION SETTING METHOD, AND COMPUTER READABLE MEDIUM

(71) Applicant: SUBARU CORPORATION, Tokyo (JP)

(72) Inventors: Shinichi Harada, Tokyo (JP); Satoshi Kuroyanagi, Tokyo (JP); Yukinobu Tomonaga, Tokyo (JP)

(73) Assignee: Subaru Corporation, Tokyo (JP)

( * ) Notice: Subject to any disclaimer, the term of this patent is extended or adjusted under 35 U.S.C. 154(b) by 76 days.

(21) Appl. No.: 15/599,902

(22) Filed: May 19, 2017

(65) Prior Publication Data

US 2017/0364068 A1    Dec. 21, 2017

(30) Foreign Application Priority Data

Jun. 15, 2016   (JP) .................................. 2016-118424

(51) Int. Cl.
*G05D 1/00* (2006.01)
*B64C 39/02* (2006.01)
(Continued)

(52) U.S. Cl.
CPC ......... *G05D 1/0027* (2013.01); *B64C 39/024* (2013.01); *B64D 45/00* (2013.01);
(Continued)

(58) Field of Classification Search
CPC .. G05D 1/0044; G05D 1/0027; G05D 1/0202; G05D 1/104
See application file for complete search history.

(56) References Cited

U.S. PATENT DOCUMENTS 5,781,437 A  *  7/1998  Wiemer ............. G01C 21/3688
                                                340/995.26
6,262,679 B1     7/2001  Tran
(Continued)

FOREIGN PATENT DOCUMENTS

CN       103256931 A       8/2013
JP       2003-522990 A     7/2003
(Continued)

OTHER PUBLICATIONS

Decision to Grant issued in corresponding Japanese Patent Application No. 2016-118424, dated Feb. 6, 2018.

*Primary Examiner* — Ryan Rink
(74) *Attorney, Agent, or Firm* — McDermott Will & Emery LLP (57) ABSTRACT

A formation setting apparatus includes a display unit, a selector, a region calculator, a display controller, and a communication controller. The display unit displays a formation of formation flying that includes aircrafts. The selector selects, as a first aircraft, one of the aircrafts displayed on the display unit, on a basis of an operation performed by a user. The region calculator calculates a movable region of the first aircraft, on a basis of a distance, to the first aircraft, from one or a plurality of second aircrafts of the aircrafts excluding the first aircraft. The display controller causes the calculated movable region to be displayed on the display unit. The communication controller transmits a control signal to the first aircraft when a position within the movable region displayed on the display unit is selected by the user. The control signal causes the first aircraft to move to the selected position.

15 Claims, 5 Drawing Sheets

(51) Int. Cl.
*G05D 1/10* (2006.01)
*G08G 5/00* (2006.01)
*B64D 45/00* (2006.01)

(52) U.S. Cl.
CPC ........... *G05D 1/104* (2013.01); *G08G 5/0008* (2013.01); *G08G 5/0013* (2013.01); *G08G 5/0021* (2013.01); *G08G 5/0026* (2013.01); *G08G 5/0052* (2013.01); *G08G 5/0069* (2013.01); *G08G 5/0082* (2013.01); *B64C 2201/143* (2013.01)

(56) References Cited

U.S. PATENT DOCUMENTS

| | | | |
|---|---|---|---|
| 6,459,411 B2 | 10/2002 | Frazier et al. | |
| 6,926,233 B1* | 8/2005 | Corcoran, III | B64C 13/20 |
| | | | 244/76 R |
| 2003/0137444 A1* | 7/2003 | Stone | G08G 5/0008 |
| | | | 342/30 |
| 2005/0090972 A1 | 4/2005 | Bodin et al. | |
| 2005/0165516 A1* | 7/2005 | Haissig | G08G 5/0008 |
| | | | 701/4 |
| 2005/0230563 A1* | 10/2005 | Corcoran, III | B64C 13/20 |
| | | | 244/175 |
| 2007/0132638 A1* | 6/2007 | Frazier | G01S 13/765 |
| | | | 342/455 |
| 2010/0030397 A1* | 2/2010 | Tachibana | B62K 1/00 |
| | | | 701/1 |
| 2010/0235098 A1 | 9/2010 | Hovstein | |
| 2017/0061803 A1 | 3/2017 | Sugaya | |
| 2017/0178515 A1* | 6/2017 | Brune | B64C 39/024 |
| 2017/0200376 A1 | 7/2017 | Itabashi et al. | |
| 2017/0270808 A1 | 9/2017 | Onomura et al. | |
| 2018/0197015 A1* | 7/2018 | Cricri | G06K 9/00221 |

FOREIGN PATENT DOCUMENTS

| | | |
|---|---|---|
| JP | 2004-025971 A | 1/2004 |
| JP | 2005-140795 A | 6/2005 |
| JP | 2013-060123 A | 4/2013 |
| JP | 2014-129996 A | 7/2014 |
| JP | 2017-046328 A | 3/2017 |
| JP | 2017-126101 A | 7/2017 |
| JP | 6194382 B1 | 9/2017 |

* cited by examiner

FORMATION SETTING APPARATUS, FORMATION SETTING METHOD, AND COMPUTER READABLE MEDIUM

CROSS-REFERENCE TO RELATED APPLICATIONS

The present application claims priority from Japanese Patent Application No. 2016-118424 filed on Jun. 15, 2016, the entire contents of which are hereby incorporated by reference.

BACKGROUND

The technology relates to a formation setting apparatus, a formation setting method, and a computer readable medium having a formation setting program, each of which sets a formation of formation flying including a plurality of aircrafts.

A formation of formation flying may sometimes be changed when a plurality of aircrafts fly in formation. For example, a pilot of a lead aircraft, or a "leader aircraft", may change the formation by performing an operation such as moving an unmanned aircraft that follows the lead aircraft. The unmanned aircraft is, in other words, a wingman aircraft.

In general, the formation is changed by setting a factor of an aircraft to be moved through inputting a numerical value. Examples of the factor may include a position and a course of the aircraft to be moved. For example, reference is made to Japanese Unexamined Patent Application Publication No. 2014-129996.

SUMMARY

A setting operation through inputting a numerical value, however, poses a large operation burden on a pilot when, for example, the pilot performs the operation while he or she flies an own aircraft.

It is desirable to provide a formation setting apparatus, a formation setting method, and a computer readable medium having a formation setting program that allow a formation of formation flying to be changed by a simple operation.

An aspect of the technology provides a formation setting apparatus that includes: a display unit that displays a formation of formation flying, in which the formation flying includes a plurality of aircrafts; a selector that selects, as a first aircraft, one of the aircrafts that are displayed on the display unit, on a basis of an operation performed by a user; a region calculator that calculates a movable region as a region in which the first aircraft is movable, on a basis of a distance, to the first aircraft, from one or a plurality of second aircrafts of the aircrafts excluding the first aircraft; a display controller that causes the movable region calculated by the region calculator to be displayed on the display unit; and a communication controller that transmits a control signal to the first aircraft when a position within the movable region displayed on the display unit is selected by the user, in which the control signal causes the first aircraft to move to the position selected by the user.

The communication controller may transmit a control signal to the one or at least one of the plurality of second aircrafts when the position within the movable region displayed on the display unit is selected by the user. The control signal may cause the one or the at least one of the plurality of second aircrafts to move and follow the first aircraft.

The aircrafts each may include a wireless communicator that allows a wireless communication to be performed between the aircrafts, and the region calculator may calculate, as the movable region, a distance region in which the first aircraft is able to perform the wireless communication with the one or at least one of the plurality of second aircrafts by the wireless communicator provided in the first aircraft.

The aircrafts may include one lead aircraft as a manned aircraft and at least one wingman aircraft as an unmanned aircraft, and the lead aircraft may include the formation setting apparatus.

The display unit may include a display provided integrally with a touch panel that receives a touch operation performed by the user.

An aspect of the technology provides a formation setting method that includes: causing a formation of formation flying to be displayed on a display unit, in which the formation flying includes a plurality of aircrafts; selecting, as a first aircraft, one of the aircrafts that are displayed on the display unit, on a basis of an input operation; calculating a movable region as a region in which the first aircraft is movable, on a basis of a distance, to the first aircraft, from one or a plurality of second aircrafts of the aircrafts excluding the first aircraft; causing the calculated movable region to be displayed on the display unit; and transmitting, with a communicator, a control signal to the first aircraft when a position within the movable region displayed on the display unit is selected, in which the control signal causes the first aircraft to move to the selected position.

An aspect of the technology provides a non-transitory computer readable medium having a formation setting program, in which the formation setting program causes, when executed by a computer, the computer to implement a method that includes: causing a formation of formation flying to be displayed on a display unit, in which the formation flying includes a plurality of aircrafts; selecting, as a first aircraft, one of the aircrafts that are displayed on the display unit, on a basis of an input operation; calculating a movable region as a region in which the first aircraft is movable, on a basis of a distance, to the first aircraft, from one or a plurality of second aircrafts of the aircrafts excluding the first aircraft; causing the calculated movable region to be displayed on the display unit; and transmitting, with a communicator, a control signal to the first aircraft when a position within the movable region displayed on the display unit is selected, in which the control signal causes the first aircraft to move to the selected position.

An aspect of the technology provides a formation setting apparatus that includes: a display that displays a formation of formation flying, in which the formation flying includes a plurality of aircrafts; and circuitry that selects, as a first aircraft, one of the aircrafts that are displayed on the display, on a basis of an operation performed by a user, calculates a movable region as a region in which the first aircraft is movable, on a basis of a distance, to the first aircraft, from one or a plurality of second aircrafts of the aircrafts excluding the first aircraft, causes the calculated movable region to be displayed on the display; and transmits a control signal to the first aircraft when a position within the movable region displayed on the display is selected by the user, in which the control signal causes the first aircraft to move to the position selected by the user.

DETAILED DESCRIPTION

In the following, a description is given of one implementation of the technology with reference to the accompanying drawings. The implementation is directed, without limitation, to an example in which a formation setting apparatus according to an implementation of the technology is applied to an unmanned aircraft operating terminal.

Configuration of Unmanned Aircraft Operating Terminal

First, a description is given of a configuration of an unmanned aircraft operating terminal 1 according to one implementation of the technology.

Figure 1:
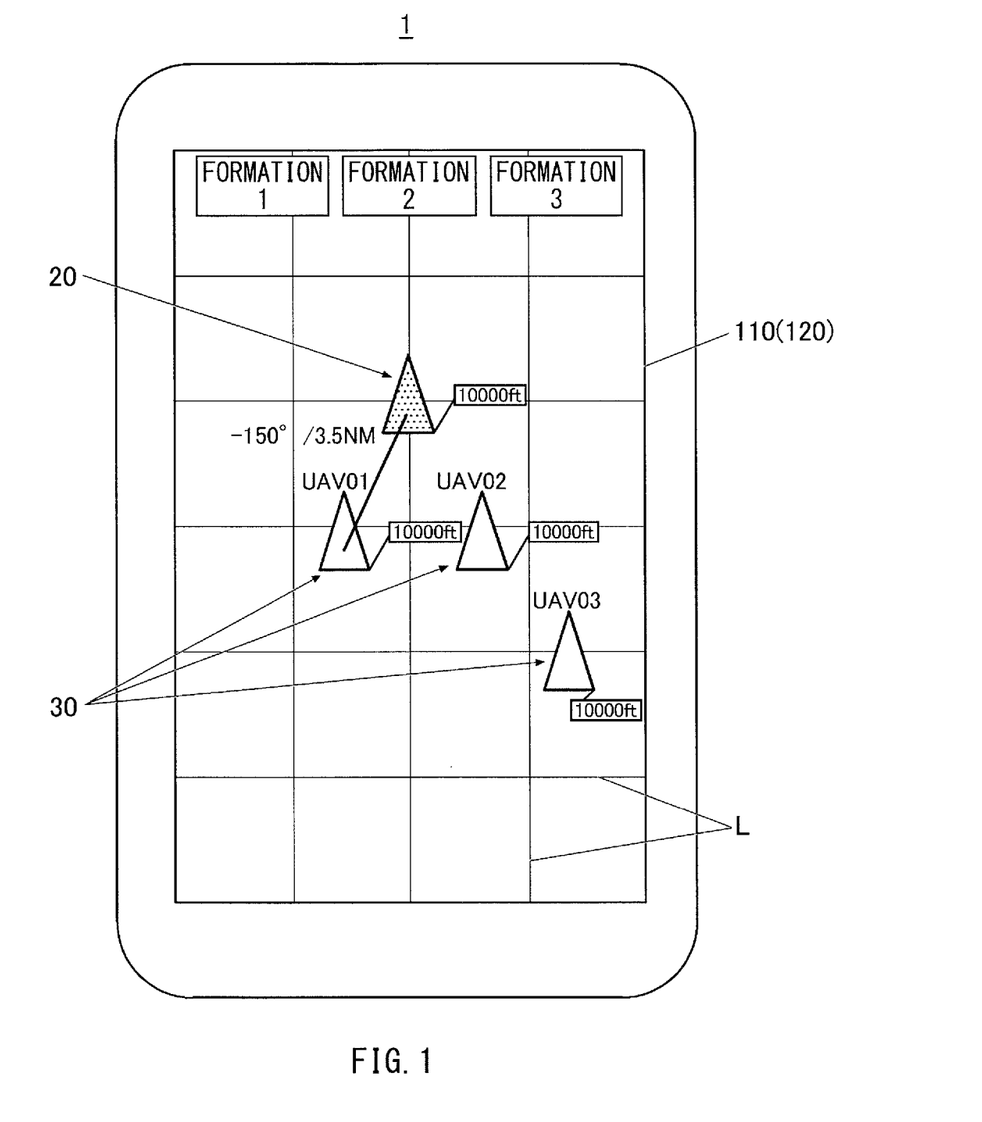
FIG. 1 illustrates an example of an appearance of an unmanned aircraft operating terminal according to an implementation of the technology.
Figure 2:
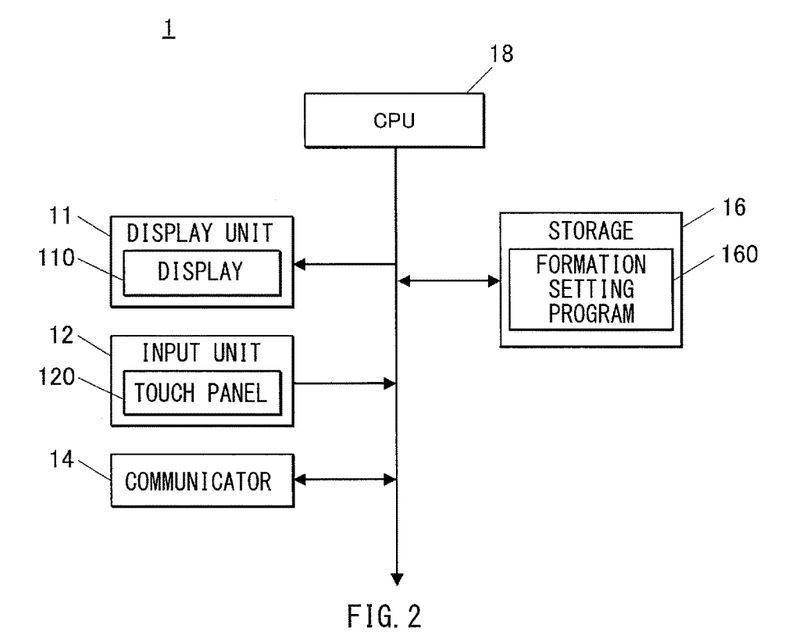
FIG. 2 is a block diagram illustrating an example of a functional configuration of the unmanned aircraft operating terminal according to the implementation.

FIG. 1 illustrates an example of an appearance of the unmanned aircraft operating terminal 1. FIG. 2 is a block diagram illustrating an example of a functional configuration of the unmanned aircraft operating terminal 1.

The unmanned aircraft operating terminal 1 is able to set a formation of formation flying that includes a plurality of unmanned aircrafts. The unmanned aircraft may be an unmanned aerial vehicle. The unmanned aircraft operating terminal 1 according to the present implementation may be a so-called electronic flight bag mounted detachably on a manned aircraft as a lead aircraft of the formation flying.

Referring to FIG. 1, the unmanned aircraft operating terminal 1 may be a tablet personal digital assistant, and may include a display 110.

The display 110 may be a display screen disposed at the front of the unmanned aircraft operating terminal 1, and may display various pieces of data that are based on an operation performed by a user. Non-limiting examples of the data may include characters and signs. The display 110 may be a liquid crystal display (LCD), an electroluminescence display (ELD), or any other suitable device having a display function.

The display 110 may also be provided integrally with a so-called touch panel 120 as illustrated in FIG. 2, whereby the display 110 may be able to receive a touch operation performed by the user.

Referring specifically to FIG. 2, the unmanned aircraft operating terminal 1 may include a display unit 11, an input unit 12, a communicator 14, a storage 16, and a central processing unit (CPU) 18. These units may be coupled to one another through a bus to allow for a data communication mutually. In one implementation, the CPU 18 may serve as a "selector", a "region calculator", a "display controller", and a "communication controller".

The display unit 11 may include the display 110. The display unit 11 may cause various pieces of information to be displayed on the display 110, on the basis of a display signal received from the CPU 18.

The input unit 12 may include the touch panel 120, and may output, to the CPU 18, a signal corresponding to the touch operation performed on the touch panel 120. For example, the input unit 120 may output the signal corresponding to a position, or any other factor, on the touch panel 120 on which the touch operation is performed.

The communicator 14 may allow for connection to a communication network by means of a wireless communication. The communicator 14 may also perform a communication with an aircraft 20 or an unmanned aircraft 30 and a communication with the unmanned aircraft 30 through the aircraft 20 to allow for transmission and reception of various signals mutually.

The storage 16 may be a memory that stores a program, data, etc., used to achieve various functions of the unmanned aircraft operating terminal 1, and serves also as a workspace of the CPU 18. The storage 16 according to the present implementation may store a formation setting program 160 that causes the CPU 18 to execute a formation setting process to be described later.

The CPU 18 may control the unmanned aircraft operating terminal 1 on an across-the-board basis, by executing a process based on a predetermined program in accordance with an inputted instruction and performing an operation such as issuance of instructions to respective functional units and a transfer of pieces of data to the respective functional units. More specifically, the CPU 18 may read out various programs stored in the storage 16 on the basis of a signal such as the operation signal received from the input unit 12, and execute a process in accordance with the read-out programs. The CPU 18 may further temporarily hold a result of the process in the storage 16, and output the result of the process to the display unit 11 on an as-needed basis.

Configuration of Formation Flying

A description is given next of a configuration of formation flying F whose formation is to be set by the unmanned aircraft operating terminal 1.

Figure 3:
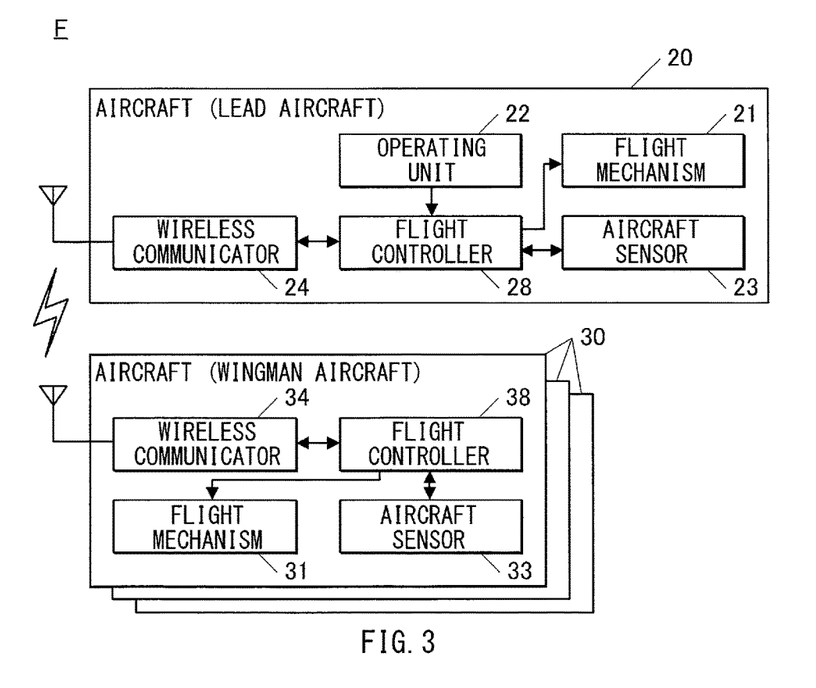
FIG. 3 is a block diagram illustrating an example of a configuration of formation flying according to the implementation.

FIG. 3 is a block diagram illustrating an example of the configuration of the formation flying F.

Referring to FIG. 3, the formation flying F according to the present implementation may include the manned aircraft 20 as the lead aircraft (i.e., the leader aircraft) and the three unmanned aircrafts 30 as wingman aircrafts of the aircraft 20.

The aircraft 20 may include a flight mechanism 21 that allows the aircraft 20 to fly, an operating unit 22 to be operated by a pilot, an aircraft sensor 23, a wireless communicator 24, and a flight controller 28.

The aircraft sensor 23 may include various sensors directed to detection of a flight state of the aircraft 20 and acquisition of information on a surrounding situation of the aircraft 20. Non-limiting examples of the various sensors may include a gyroscope, a velocity sensor, and a global positioning system (GPS), and an altitude sensor. The aircraft sensor 23 may acquire various pieces of information on the basis of control instructions given from the flight controller 28.

The wireless communicator 24 may perform a wireless communication with a control facility, the unmanned aircrafts 30, or both to allow for transmission and reception of various signals mutually. The control facility may be located at any location, such as on the ground, at the sea, and in the air.

The flight controller 28 may perform a drive control of the flight mechanism 21 to control the flight of the aircraft 20.

The flight controller 28 may also perform the transmission and the reception of the various signals between the aircraft 20 and the unmanned aircrafts 30 through the wireless communicator 24 to centrally control each part of the aircraft 20.

The unmanned aircrafts 30 each may be so configured that the flight thereof is controlled by a control command received from the aircraft 20, the control facility (located on the ground, at the sea, or in the air), or both. More specifically, the unmanned aircrafts 30 each may include a flight mechanism 31, an aircraft sensor 33, a wireless communicator 34, and a flight controller 38, which may be substantially similar to the flight mechanism 21, the aircraft sensor 23, the wireless communicator 24, and the flight controller 28 provided in the aircraft 20, respectively.

Operation of Unmanned Aircraft Operating Terminal

A description is given next, by referring to some specific but non-limiting examples, of an operation of the unmanned aircraft operating terminal 1 upon executing the formation setting process.

FIGS. 4A to 6D illustrate examples of displaying performed on the display 110 in the formation setting process.

The formation setting process sets the formation of the formation flying F, and may allow for not only initial setting of the formation before the takeoff but also an operation such as changing the formation during the flight. For example, the formation setting process may be executed upon an input of an instruction as to execute the formation setting process received through an operation performed by the pilot of the aircraft 20. Upon receiving the input, the CPU 18 may read out the formation setting program 160 from the storage 16 and load the read formation setting program 160 to thereby execute the formation setting process.

It is to be noted that FIGS. 4A to 6D each illustrate a non-limiting example in which the formation flying F includes the aircraft 20 and the unmanned aircrafts 30 that fly in substantially V-shaped formation with the aircraft 20 flying at the forefront, and in which the formation is to be changed through a user's operation performed on the unmanned aircraft operating terminal 1 mounted on the aircraft 20. In the present implementation, the user may be the pilot of the aircraft 20. It is to be also noted that the names "UAV01", "UAV02", and "UAV03" are assigned to the respective three unmanned aircrafts 30 as the wingman aircrafts for identification of those unmanned aircrafts 30. In the following description, the names UAV01 to UAV03 are also used to identify the respective unmanned aircrafts 30.

First Operation Example

First, a description is given of an operation example of the unmanned aircraft operating terminal 1 when changing a flight position of any of the unmanned aircrafts 30 of the formation flying F.

When the formation setting process is executed, the CPU 18 may first acquire information on position of each of the aircrafts of the formation flying F through the communicator 14. Further, the CPU 18 may display the formation of the formation flying F on the display 110 as illustrated in FIG. 1 on the basis of the acquired information on the position.

More specifically, the display 110 may display the formation of the formation flying F in plan view on a horizontal plane. The horizontal plane displayed on the display 110 in plan view may be defined in a grid pattern by a plurality of grid lines L. The grid lines L may extend in a flight direction of the aircraft 20 and in a direction orthogonal to the flight direction, and may be provided at predetermined intervals. The display 110 may also display an altitude of each of the aircrafts in a numerical value. The aircrafts each may be displayed in the form of an icon having a shape by which the flight direction of the corresponding aircraft is identifiable, and the names such as UAV01 to UAV03 may be displayed near the respective corresponding unmanned aircrafts 30. In the present implementation, the shape of the icon may be an isosceles triangle. Further, the aircraft 20 as the lead aircraft may be so displayed that distinction between the aircraft 20 and the unmanned aircrafts 30 as the wingman aircrafts is possible. For example, the aircraft 20 may be displayed in a color, a pattern, or both different from those of the unmanned aircrafts 30 to allow for the distinction.

Thereafter, the CPU 18 may select, on the basis of the user's operation, one of the three unmanned aircrafts 30 whose flight position is to be changed.

Figure 4A:
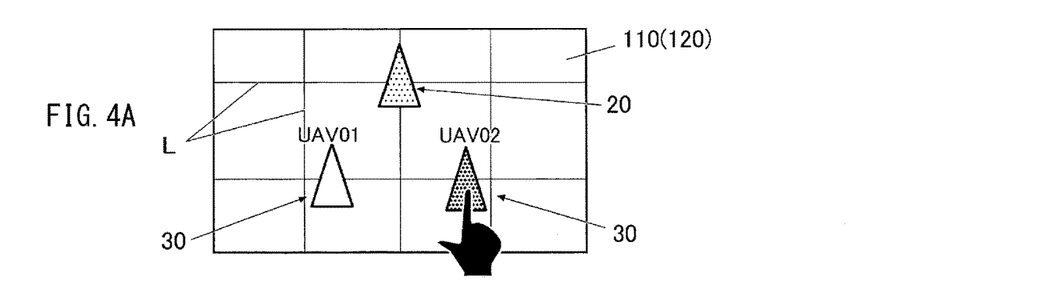
FIGS. 4A to 4E illustrate examples of displaying performed on a display in a formation setting process according to the implementation.

In the first operation example, the UAV02 is selected from the three unmanned aircrafts 30 as a result of the touch operation performed by the user on the display 110, i.e., the touch panel 120, as illustrated in FIG. 4A. The UAV02 thus selected may be placed in an active state that is ready to accept a position-changing operation, and may be displayed differently from a state in which the UAV02 is unselected.

Figure 5A:
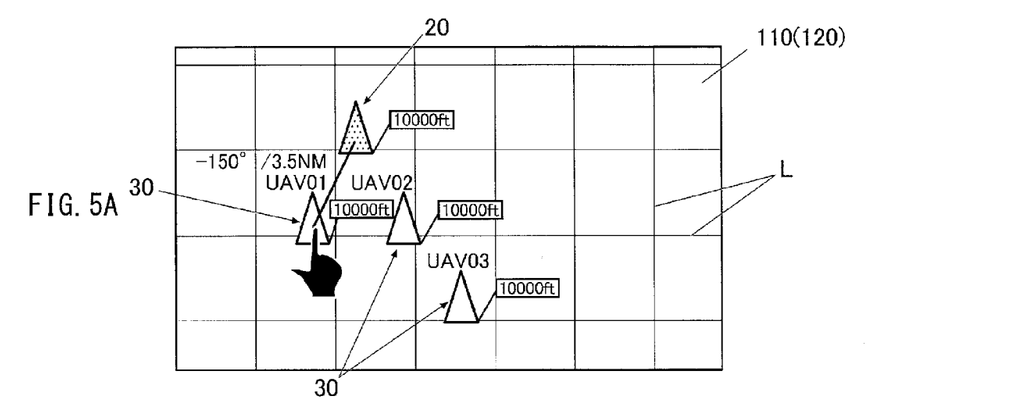
FIGS. 5A to 5C illustrate examples of displaying performed on the display in the formation setting process.

Upon selecting one of the unmanned aircrafts 30, a position of the selected unmanned aircraft 30 relative to the aircraft 20 may be displayed as illustrated in FIG. 5A and other drawings. For example, the display 110 may display an orientation of the selected unmanned aircraft 30 relative to the flight direction of the aircraft 20, a relative distance between the selected unmanned aircraft 30 and the aircraft 20, or both.

Thereafter, the CPU 18 may select one of moving operations, i.e., the position changing operations, to be performed on the selected UAV02, on the basis of the user's operation. The moving operations may include a horizontal movement and a vertical movement.

Figure 4B:
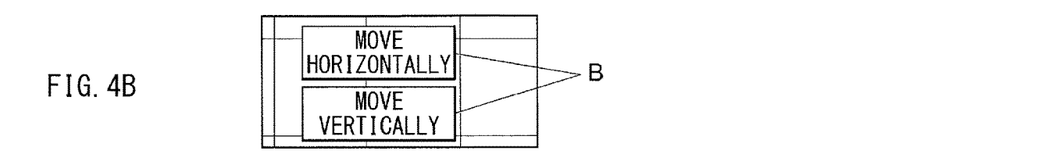

In the first operation example, the CPU 18 may cause the display 110 to display two buttons B that indicates the horizontal movement or "MOVE HORIZONTALLY" and the vertical movement or "MOVE VERTICALLY" as illustrated in FIG. 4B, and may accept the touch operation performed by the user on one of those two buttons B.

Thereafter, the CPU 18 may calculate a region in which the UAV02 is movable in a direction of the selected movement between a horizontal direction and a vertical direction, on the basis of distances, to the UAV02, from the respective other aircrafts of the formation flying F excluding the selected UAV02. The CPU 18 may calculate the movable region of the UAV02 for both of the cases where the horizontal movement is selected and where the vertical movement is selected.

In the first operation example, the CPU 18 may calculate, as the movable region, a distance region in which the selected UAV02 is able to perform, by the wireless communicator 24, the wireless communication with at least one of other aircrafts, i.e., the unselected unmanned aircrafts 30 and the aircraft 20. Upon calculating the distance region, the CPU 18 may obviously take into consideration a region into which the UAV02 is unable to proceed, such as a region where the UAV02 can be determined as being too close to any other aircraft.

Note that the movable region is not limited to the foregoing distance region. For example, the movable region may be a distance region in which the UAV02 is able to perform the wireless communication with the aircraft 20 as the lead aircraft, or may be a preset region in which deformation of the formation is tolerable.

When "MOVE HORIZONTALLY", i.e., the horizontal movement, is selected by the user, the CPU 18 may cause the display 110 to display a plurality of movable positions MP. The movable positions MP each may be a position to which the UAV02 is able to be moved within the calculated movable region in the horizontal direction.

Figure 4C:
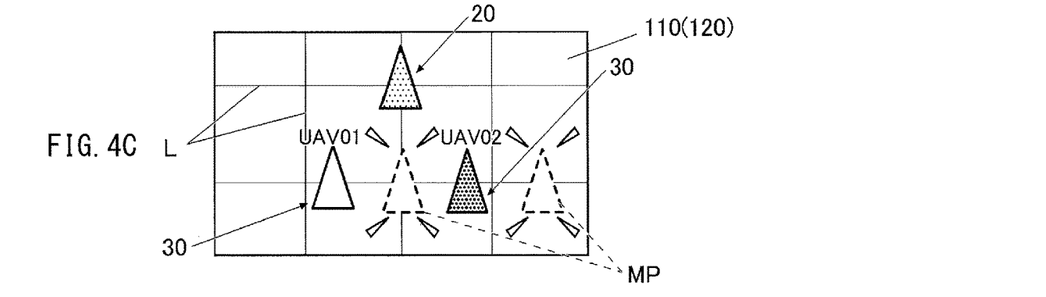

In the first operation example, an intersection of the grid lines and a midpoint of two adjacent intersections within the movable region in the horizontal direction each may be displayed in a blinking fashion as the movable positions MP, as illustrated in FIG. 4C.

Figure 4D:
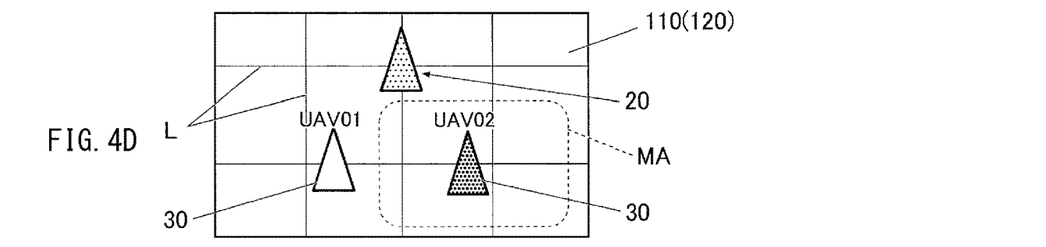

Alternatively, when "MOVE HORIZONTALLY" is selected by the user, the calculated movable region in the horizontal direction as a whole may be displayed as a movable region MA as illustrated in FIG. 4D, instead of displaying the movable positions MP.

Figure 4E:
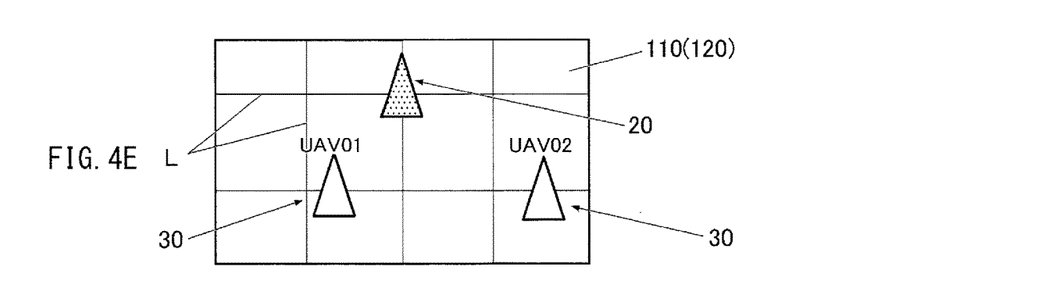

Thereafter, the CPU 18 may change the position of the UAV02 on the display 110 to a position selected by the user as illustrated in FIG. 4E, in response to a selection of any of the movable positions MP performed through the user's touch operation or in response to a selection of a position within the movable region MA. Upon changing the position of the UAV02, the CPU 18 may also cause the communicator 14 to transmit, to the UAV02, a control signal that moves the UAV02 to the selected horizontal position. By transmitting the control signal to the UAV02, the CPU 18 may thus change the actual flight position of the UAV02. Alternatively, the CPU 18 may cause, through the communicator 14, the wireless communicator 24 of the aircraft 20 to transmit the control signal.

When "MOVE VERTICALLY", i.e., the vertical movement, is selected by the user, the CPU 18 may receive an operation performed by the user, such as a flick operation, to set a flight altitude of the UAV02 changed by the user. Upon setting of the flight altitude, the CPU 18 may limit a numerical range within which the user is allowed to input a value of the flight altitude to allow the flight altitude of the UAV02 to be set within the calculated movable region in the vertical direction. Further, upon setting of the flight altitude, a numeric keypad that allows for the input of numerical value may be displayed on the display 110 to set the flight altitude on the basis of the user's operation performed on the numeric keypad, for example.

Thereafter, the CPU 18 may update the flight altitude of the UAV02 displayed on the display 110 to the set flight altitude, i.e., to the changed flight altitude. Upon updating the flight altitude of the UAV02, the CPU 18 may also cause the communicator 14 to transmit, to the UAV02, a control signal that moves the UAV02 to the selected altitude position. By transmitting the control signal to the UAV02, the CPU 18 may thus change the actual flight altitude of the UAV02. Alternatively, the CPU 18 may cause, through the communicator 14, the wireless communicator 24 of the aircraft 20 to transmit the control signal.

Second Operation Example

A description is given next of another operation example of the unmanned aircraft operating terminal 1 when changing the flight position of any of the unmanned aircrafts 30 of the formation flying F.

The present second operation example illustrates a case in which the flight position of any of the unmanned aircrafts 30 is to be changed by means of a simple touch operation performed on the touch panel 120 by the user, and in which other unmanned aircrafts 30 are to follow the change made to the flight position.

When the formation setting process is executed, the CPU 18 may first display the formation of the formation flying F on the display 110 as illustrated in FIG. 1, as with the foregoing first operation example.

Figure 5B:
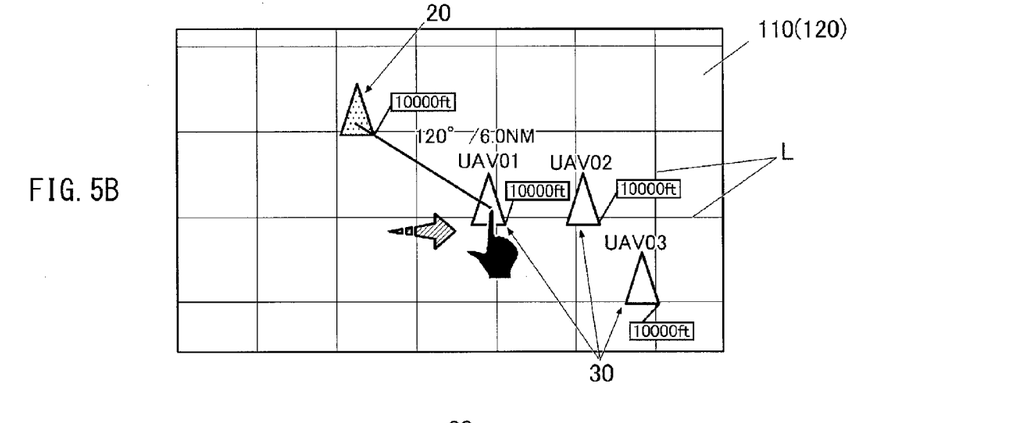
Figure 5C:
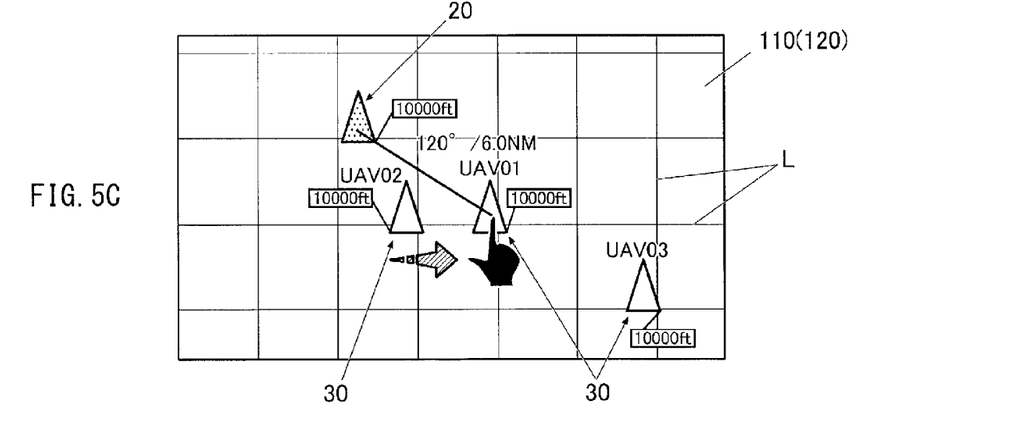

Thereafter, when receiving a drag operation performed by the user on any of the unmanned aircrafts 30 on the display 110, i.e., on the touch panel 120, the CPU 18 may move that unmanned aircraft 30 horizontally in accordance with the drag operation as illustrated in FIGS. 5A and 5B. It is to be noted that the unmanned aircraft 30 on which the drag operation is performed is the UAV01 in the second operation example.

More specifically, the CPU 18 may calculate, as with the foregoing first operation example, the movable region in the horizontal direction of the UAV01 on which the drag operation is performed by the user. Thereafter, the CPU 18 may cause the UAV01 to be moved on the display 110 in accordance with the drag operation performed by the user, within the calculated movable region in the horizontal direction. The CPU 18 may stop the movement of the UAV01 immediately before the UAV01 moves outside the movable region if the user's drag operation is performed beyond the movable region.

Upon moving the position of the UAV01, the CPU 18 may also cause other unmanned aircrafts 30, i.e., the UAV02 and the UAV03, to be moved likewise on the display 110 together with the UAV01 on which the drag operation is performed by the user. Here, the UAV02 and the UAV03 may be so moved on the display 110 as to follow the UAV01.

Thereafter, the CPU 18 may cause the communicator 14 to transmit, to the UAV01 to the UAV03, the control signals that change their respective horizontal positions. By transmitting the control signals to the UAV01 to the UAV03, the CPU 18 may thus change the actual flight positions of the respective UAV01 to UAV03 to the positions specified on the display 110. Alternatively, the CPU 18 may cause, through the communicator 14, the wireless communicator 24 of the aircraft 20 to transmit the control signals.

With this configuration, the three unmanned aircrafts 30, i.e., the wingman aircrafts, may be moved similarly to one another, and the formation of the formation flying F may be changed accordingly.

It is to be noted that whether to cause the unmanned aircrafts 30, other than the UAV01 on which the drag operation is performed, to follow the UAV01 may be set optionally. Alternatively, any of the unmanned aircrafts 30 may be set optionally to follow the UAV01 on which the drag operation is performed. In this case, referring by way of example to FIG. 5C in which the UAV02 is set previously to keep its flight position, the CPU 18 may so move only the UAV03 as to follow the UAV01 without causing the UAV02 to follow the UAV01.

Further, when any of the unmanned aircrafts 30, other than the UAV01 on which the drag operation is performed, is limited in its moving region, that unmanned aircraft 30 may be so moved as to follow the UAV01 within the moving region set for that unmanned aircraft 30.

These features also apply similarly to the vertical movement to be described below.

Figure 6A:
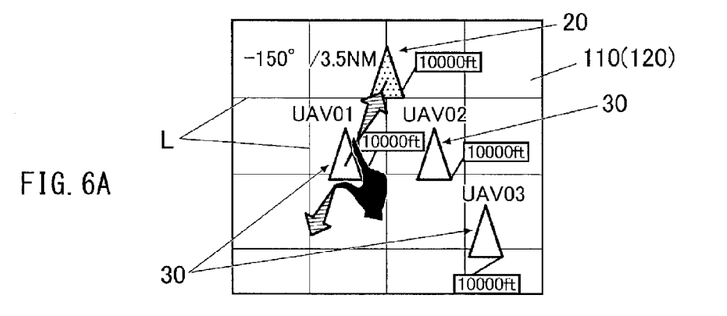
FIGS. 6A to 6D illustrate examples of displaying performed on the display in the formation setting process.

Referring to FIG. 6A, when receiving a stretch operation or a "pinch out" operation performed by the user on any of the unmanned aircrafts 30 on the display 110, i.e., on the touch panel 120, the CPU 18 may decrease the flight altitude of that unmanned aircraft 30 in accordance with the stretch operation. It is to be noted that the unmanned aircraft 30 on which the stretch operation is performed is the UAV01 in the second operation example.

Figure 6B:
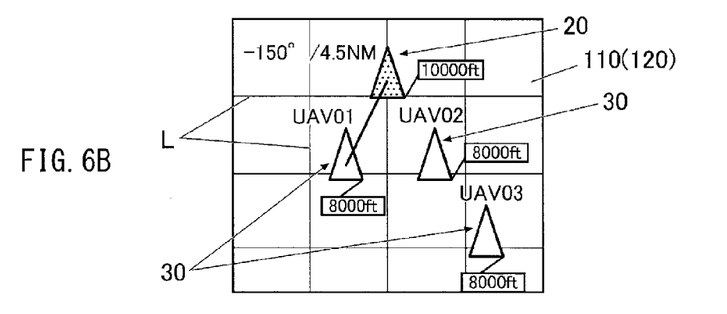

More specifically, the CPU 18 may calculate, as with the foregoing first operation example, the movable region in the vertical direction of the UAV01 on which the stretch operation is performed by the user. Thereafter, as illustrated in FIG. 6B, the CPU 18 may change, within the calculated movable region in the vertical direction, the flight altitude displayed on the display 110 of the UAV01 in accordance with an amount of displacement, such as a distance of movement of a finger, in the stretch operation performed by the user.

Upon changing the flight altitude of the UAV01, the CPU 18 may also change the flight altitudes of other unmanned aircrafts 30, i.e., the UAV02 and the UAV03, likewise together with the UAV01 on which the stretch operation is performed by the user. Here, the flight altitudes of the UAV02 and the UAV03 may be so changed as to follow the change in flight altitude made to the UAV01.

Thereafter, the CPU 18 may cause the communicator 14 to transmit, to the UAV01 to the UAV03, the control signals that change their respective flight altitudes. By transmitting the control signals to the UAV01 to the UAV03, the CPU 18 may thus decrease the actual flight altitudes of the respective UAV01 to UAV03. Alternatively, the CPU 18 may cause, through the communicator 14, the wireless communicator 24 of the aircraft 20 to transmit the control signals.

Figure 6C:
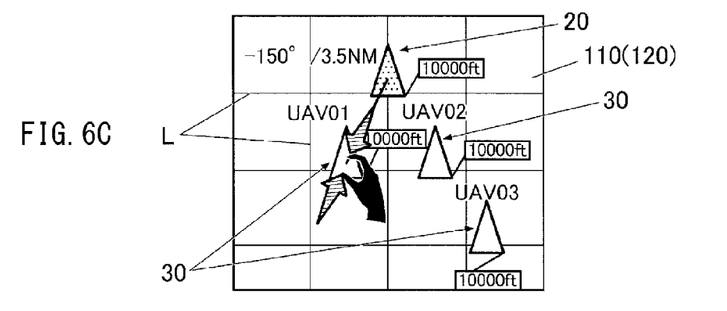

Further, when receiving a pinch operation or a "pinch in" operation performed by the user on any of the unmanned aircrafts 30 on the display 110, i.e., on the touch panel 120, the CPU 18 may increase the flight altitude of that unmanned aircraft 30 in accordance with the pinch operation, as illustrated in FIG. 6C. It is to be noted that the unmanned aircraft 30 on which the pinch operation is performed is the UAV01 in the second operation example.

Figure 6D:
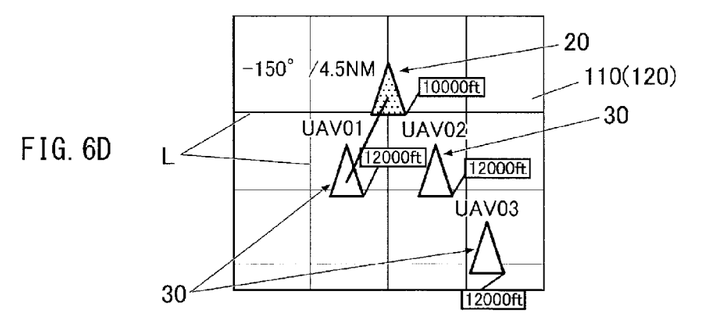

More specifically, the CPU 18 may calculate, as with the foregoing first operation example, the movable region in the vertical direction of the UAV01 on which the pinch operation is performed by the user. Thereafter, as illustrated in FIG. 6D, the CPU 18 may change, within the calculated movable region in the vertical direction, the flight altitude displayed on the display 110 of the UAV01 in accordance with an amount of displacement, such as a distance of movement of a finger, in the pinch operation performed by the user.

Upon changing the flight altitude of the UAV01, the CPU 18 may also change the flight altitudes of other unmanned aircrafts 30, i.e., the UAV02 and the UAV03, likewise together with the UAV01 on which the pinch operation is performed by the user. Here, the flight altitudes of the UAV02 and the UAV03 may be so changed as to follow the change in flight altitude made to the UAV01.

Thereafter, the CPU 18 may cause the communicator 14 to transmit, to the UAV01 to the UAV03, the control signals that change their respective flight altitudes. By transmitting the control signals to the UAV01 to the UAV03, the CPU 18 may thus increase the actual flight altitudes of the respective UAV01 to UAV03. Alternatively, the CPU 18 may cause, through the communicator 14, the wireless communicator 24 of the aircraft 20 to transmit the control signals.

Example Effects

According to the foregoing implementation, when the user selects one of the unmanned aircrafts 30 from the formation flying F displayed on the display 110, the movable region in which the selected unmanned aircraft 30 is movable is calculated on the basis of a distance from any other aircraft to the selected unmanned aircraft 30. The thus-calculated movable region is displayed on the display 110. Further, when the user selects any position within the movable region, the control signal that moves the unmanned aircraft 30 to the selected position is transmitted to that unmanned aircraft 30.

Thus, it is possible for the user to move any unmanned aircraft 30 only by performing an operation of selecting any unmanned aircraft 30 while seeing the display 110. Hence, it is possible to change the formation of the formation flying F by a simple operation as compared with an existing example where an operation of inputting a numerical value is required.

In addition, when a position to which any unmanned aircraft 30 is to be moved is selected by the user, the control signal may be transmitted to any other unmanned aircraft 30. The control signal may so move any other unmanned aircraft 30 as to follow the unmanned aircraft 30 whose position is selected by the user.

Thus, simply performing an operation of moving any unmanned aircraft 30 causes any other unmanned aircraft 30 to move in such a manner as to follow that unmanned aircraft 30. Hence, it is possible to change the formation of the formation flying by a simpler operation.

Further, the display 110 may be provided integrally with the touch panel 120. Hence, the user is able to change the formation of the formation flying in a more simplified fashion by performing the touch operation on the display 110.

Modification Examples

Although some preferred implementations of the technology have been described above with reference to the accompanying drawings, the technology is by no means limited to the foregoing implementations. The implementations may be variously modified on an as-needed basis insofar as they are within the scope of the appended claims or the equivalents thereof.

For example, the formation flying F includes the manned aircraft 20 as the lead aircraft and the unmanned aircrafts 30 as the wingman aircrafts in the foregoing implementation. A configuration of the formation flying F, however, is not limited thereto. In an alternative implementation, the formation flying F may include no lead aircraft. In yet alternative implementation, all of the aircrafts may be the unmanned aircrafts or the manned aircrafts.

Further, for example, it is not essential for the formation setting apparatus according to one implementation of the technology to be mounted on the aircraft 20. In an alternative implementation, the formation setting apparatus may be provided at a ground facility such as the control facility. Further, the formation setting apparatus is not limited to a tablet device, and may be any device that includes a display.

In one implementation described above, the CPU 18 may alternatively be a semiconductor integrated circuit that may have devices such as, but not limited to, a central processing unit (CPU), ROM, and RAM. In another implementation, the CPU 18 may alternatively be an integrated circuit such as, but not limited to, a field programmable gate array (FPGA) and an application specific integrated circuit (ASIC).

The implementation also provides a program as the formation setting program 160 that causes a computer or a circuitry to function as the CPU 18, and a recording medium that stores the program. The recording medium is computer readable or circuitry readable. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

The invention claimed is:

1. A formation setting apparatus comprising:
   a display unit configured to display a formation of formation flying, the formation flying including a plurality of aircrafts;
   a selector configured to select, as a first aircraft, one of the aircrafts that are displayed on the display unit, on a basis of an operation performed by a user;
   a region calculator configured to calculate a movable region as a region in which the first aircraft is movable, on a basis of a distance, to the first aircraft, from one or a plurality of second aircrafts of the aircrafts excluding the first aircraft;
   a display controller configured to cause the movable region calculated by the region calculator to be displayed on the display unit; and
   a communication controller configured to transmit a control signal to the first aircraft when a position within the movable region displayed on the display unit is selected by the user, the control signal causing the first aircraft to move to the position selected by the user.

2. The formation setting apparatus according to claim 1, wherein the communication controller transmits a control signal to the one or at least one of the plurality of second aircrafts when the position within the movable region displayed on the display unit is selected by the user, the control signal causing the one or the at least one of the plurality of second aircrafts to move and follow the first aircraft.

3. The formation setting apparatus according to claim 1, wherein
   the aircrafts each include a wireless communicator that allows a wireless communication to be performed between the aircrafts, and
   the region calculator calculates, as the movable region, a distance region in which the first aircraft is able to perform the wireless communication with the one or at least one of the plurality of second aircrafts by the wireless communicator provided in the first aircraft.

4. The formation setting apparatus according to claim 2, wherein
   the aircrafts each include a wireless communicator that allows a wireless communication to be performed between the aircrafts, and
   the region calculator calculates, as the movable region, a distance region in which the first aircraft is able to perform the wireless communication with the one or at least one of the plurality of second aircrafts by the wireless communicator provided in the first aircraft.

5. The formation setting apparatus according to claim 1, wherein
   the aircrafts include one lead aircraft as a manned aircraft and at least one wingman aircraft as an unmanned aircraft, and
   the lead aircraft includes the formation setting apparatus.

6. The formation setting apparatus according to claim 2, wherein
   the aircrafts include one lead aircraft as a manned aircraft and at least one wingman aircraft as an unmanned aircraft, and
   the lead aircraft includes the formation setting apparatus.

7. The formation setting apparatus according to claim 3, wherein
   the aircrafts include one lead aircraft as a manned aircraft and at least one wingman aircraft as an unmanned aircraft, and
   the lead aircraft includes the formation setting apparatus.

8. The formation setting apparatus according to claim 4, wherein
   the aircrafts include one lead aircraft as a manned aircraft and at least one wingman aircraft as an unmanned aircraft, and
   the lead aircraft includes the formation setting apparatus.

9. The formation setting apparatus according to claim 1, wherein the display unit comprises a display provided integrally with a touch panel that receives a touch operation performed by the user.

10. The formation setting apparatus according to claim 2, wherein the display unit comprises a display provided integrally with a touch panel that receives a touch operation performed by the user.

11. The formation setting apparatus according to claim 3, wherein the display unit comprises a display provided integrally with a touch panel that receives a touch operation performed by the user.

12. The formation setting apparatus according to claim 4, wherein the display unit comprises a display provided integrally with a touch panel that receives a touch operation performed by the user.

13. A formation setting method comprising:
    causing a formation of formation flying to be displayed on a display unit, the formation flying including a plurality of aircrafts;
    selecting, as a first aircraft, one of the aircrafts that are displayed on the display unit, on a basis of an input operation;
    calculating a movable region as a region in which the first aircraft is movable, on a basis of a distance, to the first aircraft, from one or a plurality of second aircrafts of the aircrafts excluding the first aircraft;
    causing the calculated movable region to be displayed on the display unit; and
    transmitting, with a communicator, a control signal to the first aircraft when a position within the movable region displayed on the display unit is selected, the control signal causing the first aircraft to move to the selected position.

14. A non-transitory computer readable medium having a formation setting program, the formation setting program causing, when executed by a computer, the computer to implement a method, the method comprising:
    causing a formation of formation flying to be displayed on a display unit, the formation flying including a plurality of aircrafts;
    selecting, as a first aircraft, one of the aircrafts that are displayed on the display unit, on a basis of an input operation;
    calculating a movable region as a region in which the first aircraft is movable, on a basis of a distance, to the first aircraft, from one or a plurality of second aircrafts of the aircrafts excluding the first aircraft;
    causing the calculated movable region to be displayed on the display unit; and
    transmitting, with a communicator, a control signal to the first aircraft when a position within the movable region displayed on the display unit is selected, the control signal causing the first aircraft to move to the selected position.

15. A formation setting apparatus comprising:
a display that displays a formation of formation flying, the formation flying including a plurality of aircrafts; and
circuitry that
selects, as a first aircraft, one of the aircrafts that are displayed on the display, on a basis of an operation performed by a user,
calculates a movable region as a region in which the first aircraft is movable, on a basis of a distance, to the first aircraft, from one or a plurality of second aircrafts of the aircrafts excluding the first aircraft,
causes the calculated movable region to be displayed on the display; and
transmits a control signal to the first aircraft when a position within the movable region displayed on the display is selected by the user, the control signal causing the first aircraft to move to the position selected by the user.

* * * * *